United States Patent [19]

Stolarczyk

[11] Patent Number: 4,777,652

[45] Date of Patent: Oct. 11, 1988

[54] RADIO COMMUNICATION SYSTEMS FOR UNDERGROUND MINES

[75] Inventor: Larry G. Stolarczyk, Raton, N. Mex.

[73] Assignee: A.R.F. Products, Raton, N. Mex.

[21] Appl. No.: 402,258

[22] Filed: Jul. 27, 1982

[51] Int. Cl.[4] ............................................. H04B 5/00
[52] U.S. Cl. ............................................ 455/3; 455/14;
455/15; 455/41; 455/55; 455/89
[58] Field of Search .................... 455/14, 15, 41, 55,
455/89, 3; 179/82; 340/310 R, 310 A, 310 CP;
379/55

[56] References Cited

U.S. PATENT DOCUMENTS

| 2,285,083 | 6/1942 | Cover, Sr. ................. | 455/89 |
|---|---|---|---|
| 3,505,615 | 4/1970 | Simons ...................... | 455/3 |
| 3,543,262 | 11/1970 | Hutton ....................... | 455/41 |
| 3,609,247 | 9/1971 | Halstead .................... | 455/41 |
| 3,750,020 | 7/1973 | Baba et al. ................. | 455/14 |
| 3,803,366 | 4/1974 | Ishii et al. .................. | 179/82 |
| 3,942,170 | 3/1976 | Whyte ........................ | 340/310 R |
| 4,142,178 | 2/1979 | Whyte et al. ............... | 340/310 R |

OTHER PUBLICATIONS

"System Design and Performance of an MF Radio Communication System for Underground Mining" by Stolarczyk & Chufo, 5-9/10/1981.
"A Mental Telegraf" by Buchbinder, Radio News, 6/1921.
"The Design of Cellular MF Radio Communication System for Underground Mining" by Stolarczyk, 11/30-12/4/1980.

Primary Examiner—Michael A. Masinick
Attorney, Agent, or Firm—Burmeister, York, Palmatier, Hamby & Jones

[57] ABSTRACT

A radio communications system operational within the medium frequency range for underground mine communications, coupling MF carrier signals into existing conductive channels extending to within the mine and devices within the mine and coupled to the conductive channel for receiving the MF carrier signals and communicating with portable and mobile transceivers operational within the MF frequency range and in the common seam mode.

14 Claims, 4 Drawing Sheets

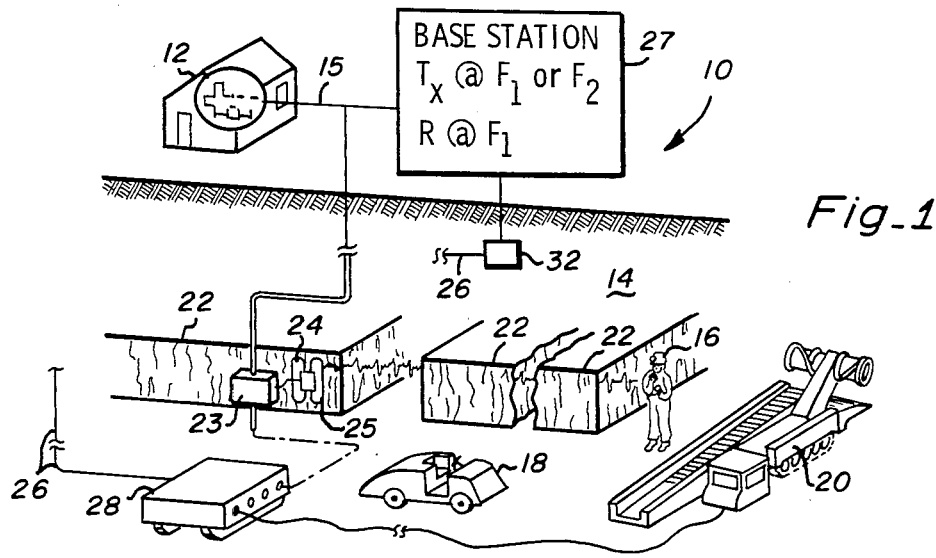
Fig_1
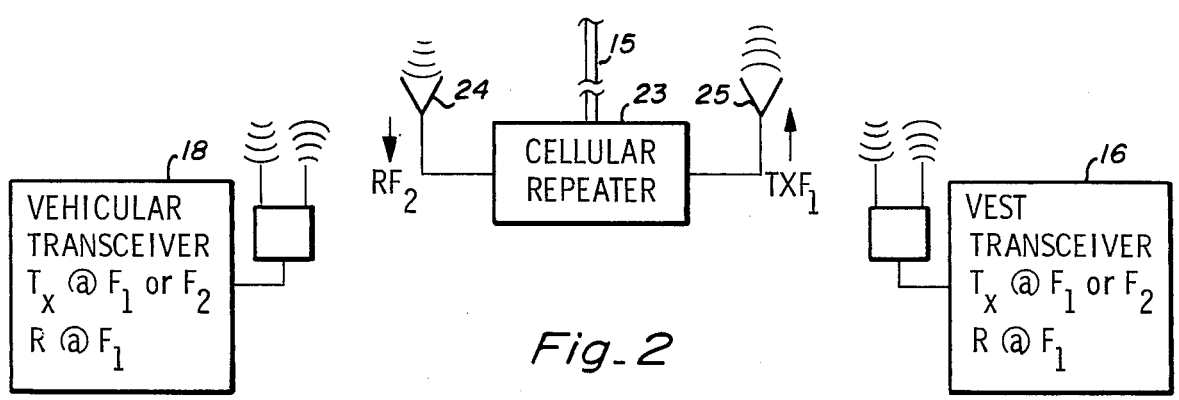
Fig_2
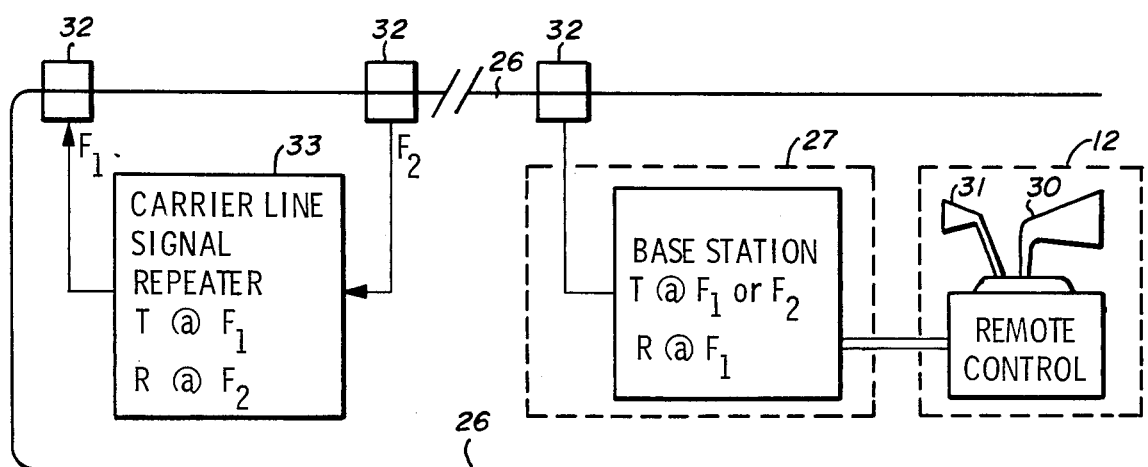
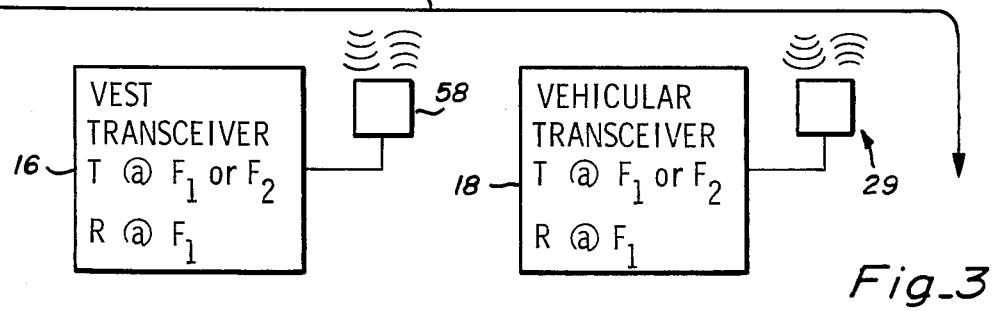
Fig_3

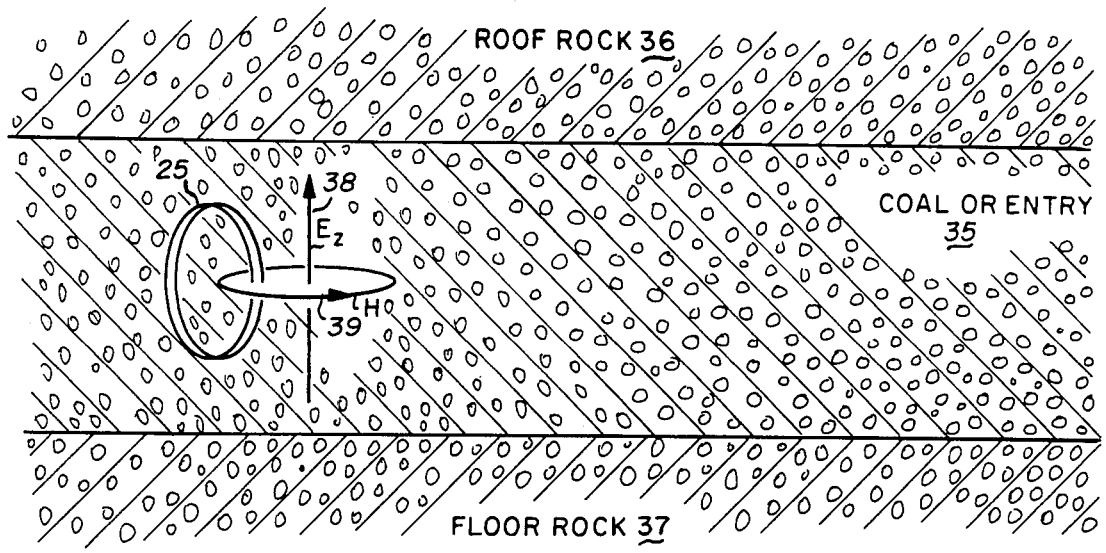
Fig_4
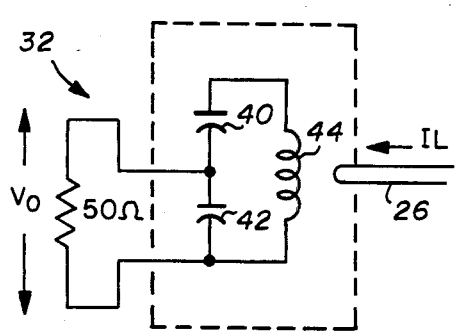
Fig_5A
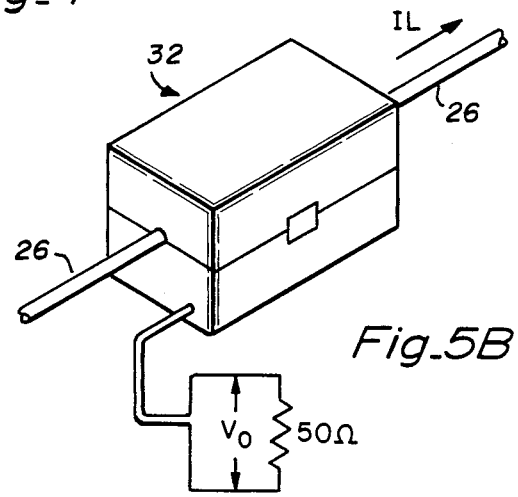
Fig_5B
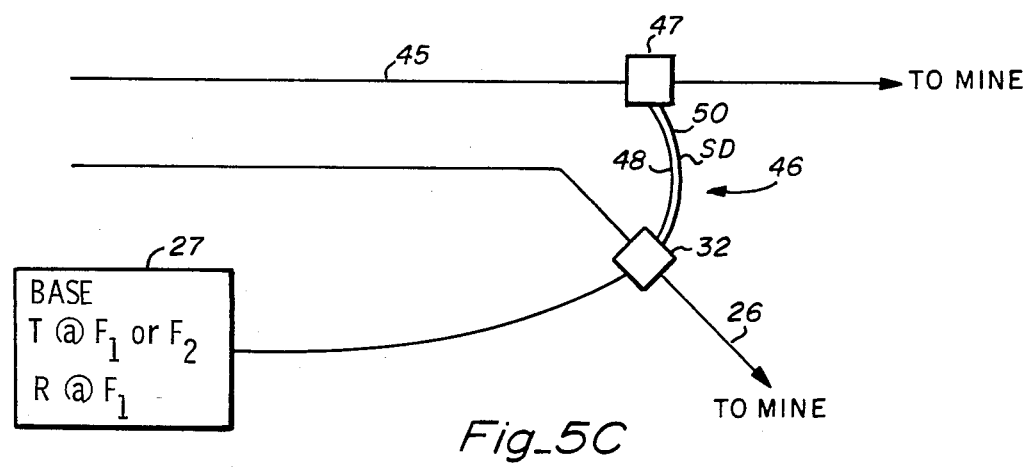
Fig_5C

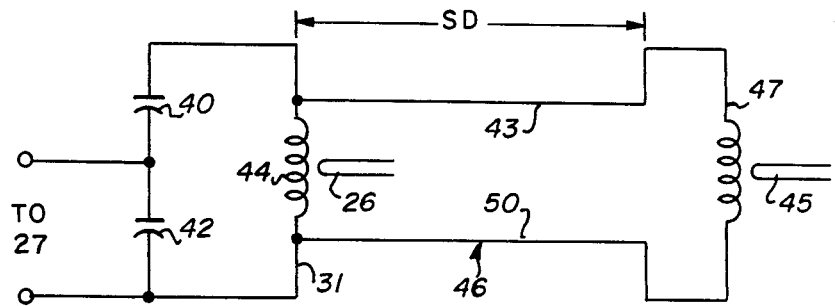
Fig_5D
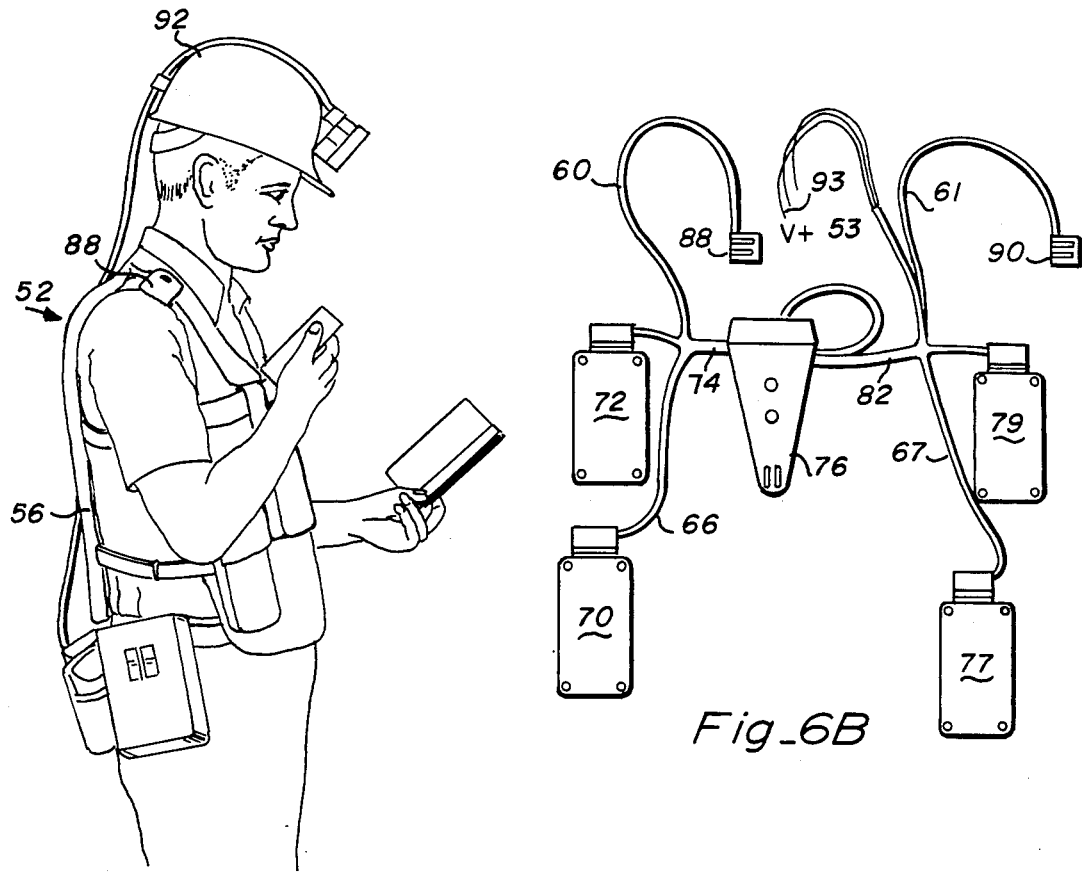
Fig_6A
Fig_6B
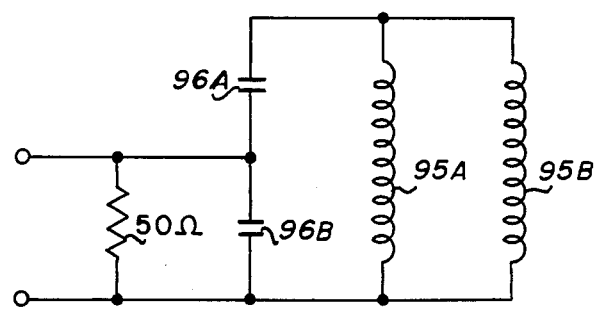
Fig_7

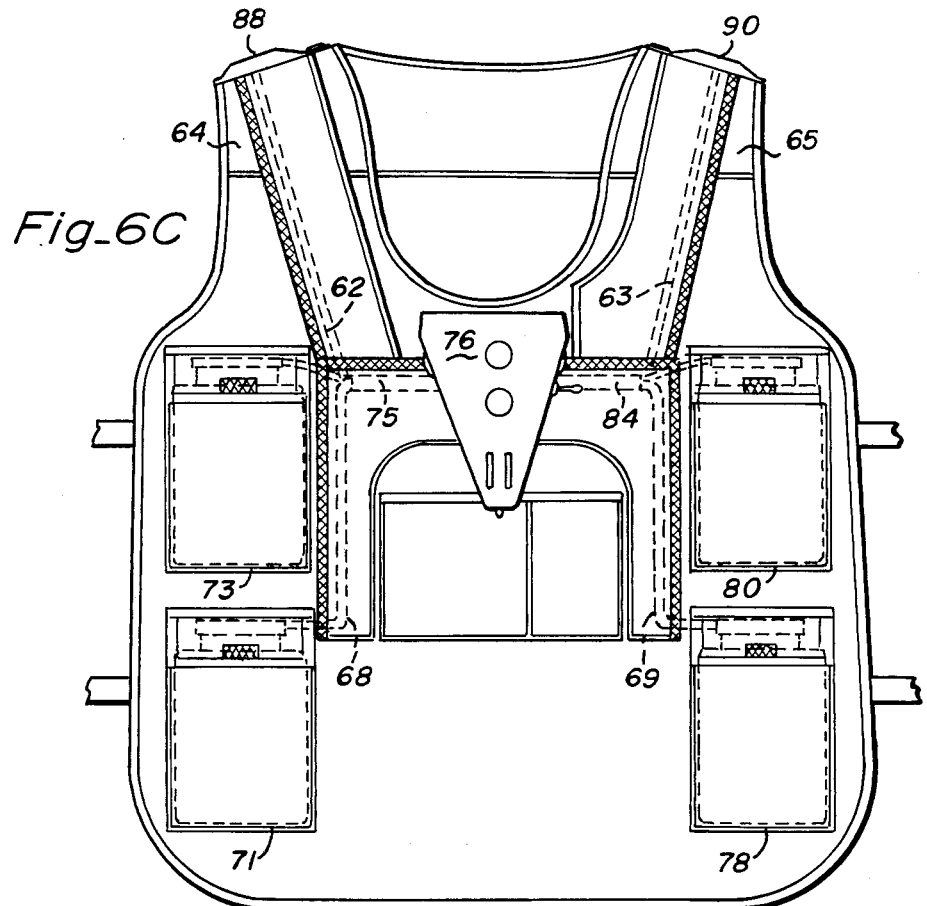
Fig_6C
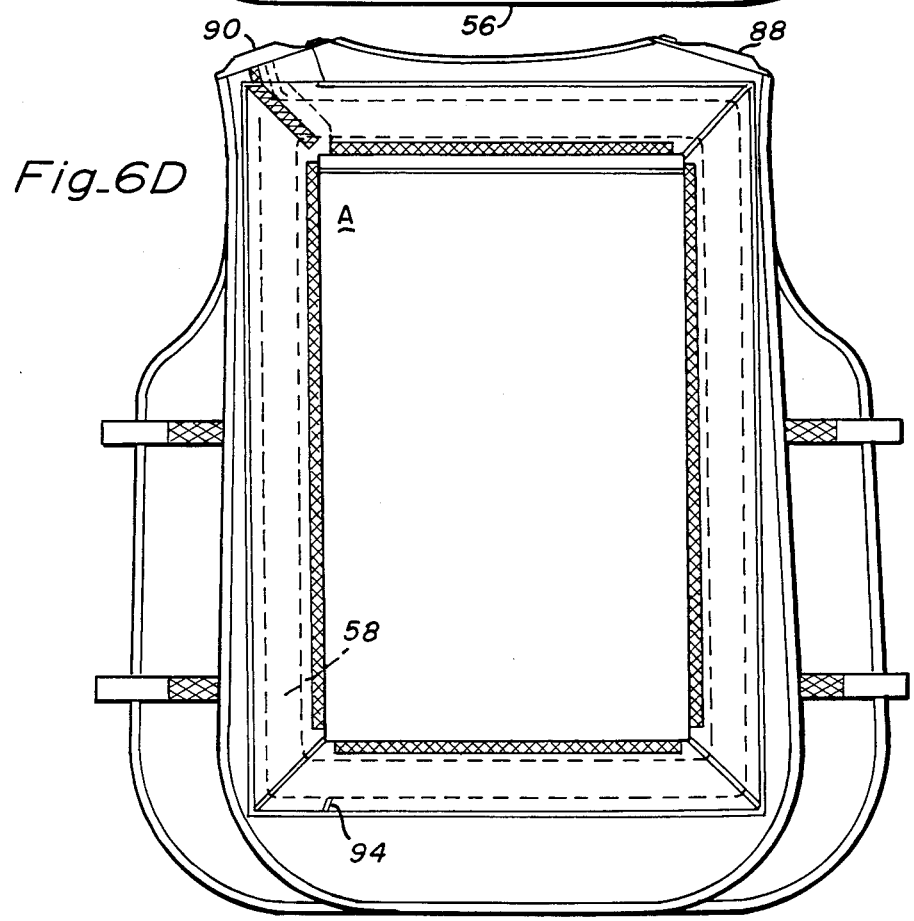
Fig_6D

RADIO COMMUNICATION SYSTEMS FOR UNDERGROUND MINES

BACKGROUND OF THE INVENTION

1. Field of the Invention

The present invention relates to communication systems for underground mines and in particular, radio communication systems operating within the medium frequency range to provide radio coverage to mobile personnel within the mine via parasitic coupling into and from existing mine conductors.

2. Description of Prior Art

Although radio transmission on the surface of the earth is well understood, radio transmission in an underground environment has posed many problems. Complex interactions occur between the radio waves and the underground environment. Characteristics of the geology (stratified layering, boundering effects, conductivity, etc.) and the mine complex (entry dimensions, conductors, electromagnetic interferences, etc.) must be measured and understood even before a practical mine radio communication system can be built. To this end, considerable research has been conducted. For example, Arthur D. Little, "Propagation of Radio Waves in Coal Mines, Task Order 1, Task Order F," BuMines Open File Report 46-77, 1977.

In a confined area such as a mine, a radio wave can propagate a useful distance only if the environment has the necessary electrical and physical properties. The "environment" takes into account the natural geology and man-made perturbations such as the mine complex itself. For example, if the wave length of a radio wave is small compared to the entry dimensions, a wave guide mode of propagation is possible. Attenuation depends primarily upon the physical properties of the entry such as cross-sectional area, wall roughness, entry tilts, and obstacles in the propagation path. Secondary effects such as the dielectric constants in earth conductivity also influence attenuation. Mine radio systems based upon this effect are available commercially. These are UHF systems operating around 450 MHz which provide useful but limited coverage. In high coal line-of-site, ranges of 300 meters are often possible. In nonline-of-site, such as going around a coal pillar, range is reduced severely. In lower coal, or when obstacles exist in the propagation path, range is reduced even more. For this reson, a UHF radio system requires an extensive network of leaky feeder transmission cables and repeaters to become useful. Even so, range from the cable is not usually great, and equipment cost is very high. Medium frequency (MF) signals, i.e., in the range of 300 kHz–3 MHz, and standard mine carrier frequency signals, i.e., 61 kHz–190 kHz, propagate in the underground environment.

The Chamber of Mines of South Africa made various attempts to improve underground mine radio communications. They have made efforts to develop radio systems for deep mines, primarily gold mines. See Austin, B. A., "Underground Radio Communication Techniques and Systems in South African Mines"; Proceedings, Electromagnetic Guided Waves in Mine Environments Workshop, Golden, Colo., 1978, pp. 87-102. Consequently, a 1-W SSB portable radio system was developed. However, performance of these units in U.S. coal mines was not satisfactory for various reasons. First, U.S. mines are highly mechanized with electrical equipment, thereby producing considerable electromagnetic interference (EMI) which desensitizes single sideband (SSB) radios. Secondly, the units which were produced were not of sufficient power. U.S. mines are mostly room and pillar, which means that any radio system must have reasonable range from local conductors. Furthermore, the electrical parameters of the geology is less favorable in the United States than in gold mines of South Africa.

Many tests have been conducted to determine the actual propagation characteristics of medium frequency (MF) signals underground and to relate the propagation to the underground environment, such as geology, entry size, existing conductors, EMI, etc. For example, see Lagace, R. L., A. G. Emslie, and M. A. Grossman; "Modeling and Data Analysis of 50–5000 kHz Radio Wave Propagation in Coal Mines," Task Order 4, Bu-Mines Contract HO346045, Arthur D. Little, Inc., Bu-Mines Open File Report 83-80, 1980.; Corey, T. S., "Propagation of EM Signal in Underground Mines"; BuMines Contract HO366028, Collins Radio Group; BuMines Open File Report 136-78, 1977; Collins Commercial Telecommunications, "Electromagnetic Noise and Propagation in Low Coal Mines at Medium Frequencies;" Contract HO377053; BuMines Open File No. 63-82, 1982. These programs formed a foundation for an understanding of how medium frequency signals propagate in a stratified medium of various electrical parameters and which are often interlaced by man-made conducting structures (rails and power lines) in artificial voids (entry ways).

In the mining of minerals, the productivity, efficiency and safety depend a great deal on communications between the miners underground with each other and with surface stations. Also, it is necessary, from an economical viewpoint, to provide a radio communication system which does not require special or dedicated communications cable within the mine. Also, it is necessary to have radio communications between miners while they are working and mobile. As a result thereof, it is necessary to have communication equipment on the miners' bodies which does not interfere with the miners' mining activities. Communication is also desirable between underground mobile mining equipment, the individual miners and the ground stations. Furthermore, it is necessary for such units to operate at low electrical power since safety requires that equipment not be prone to creating sparks which may cause destructive events.

SUMMARY OF THE PRESENT INVENTION

It is an object of the present invention to provide a radio communications system for underground mining which allows miners to maintain communications with a surface base.

It is a further object to have a radio communications system for underground mining wherein the miners may maintain communications with others within the mine with whom they need to communicate.

It is a further object to provide an underground mine radio communications system which does not require special communications cabling within the mine dedicated to it.

It is a further object to provide a radio communications system which can be parasitically coupled to existing mine lines, e.g., power cables, telephone lines, rails, etc. to achieve coverage throughout the mine.

It is a further object to provide a radio communication system for underground communications which can be quickly and easily installed.

It is a further object of the present invention to provide an underground radio communications system which can be readily expanded.

It is a further object to provide an underground radio communications system which may have a variable number of underground stations and where the underground stations may be readily relocated and/or the number of stations readily increased or decreased.

It is a further object of the present invention to provide an underground radio communications system in which a transceiver may be positioned on the body of individual miners in a way so as not to interfere with the miner's mining task.

It is a further object of the present invention to provide a radio communications system for underground mining which is operational within the underground area that is highly electrified with considerable electromagnetic interference (EMI) in the area.

It is a further object of the present invention to provide an underground radio communications system wherein the mobile units may communicate directly with one another and to a remote base station.

It is a further object of the invention to provide a system which can include a plurality of networks each of which may be operated independent of the others.

In a preferred embodiment of the present invention, a radio communications system, operating within the medium frequency range, provides coverage from an above ground area to vehicles and mobile personnel located in the mine via parasitic coupling into and from existing mine conductors. The system consists of base stations which are parasitically coupled near the ground surface by RF couplers to existing mine conductors; carrier line signal repeaters which are parasitically coupled to the mine conductors within the mine by RF couplers, and repeaters which communicate by parasitic coupling to vehicular and mobile personal transceivers within the underground mining area.

An advantage of the present invention is that it provides a network for underground mining communications wherein a plurality of networks may be operated independent of the others.

A further advantage of the present invention is that it provides for parasitic coupling into and out of existing mine conductors.

It is a further advantage of the present invention that it provides for a radio communications system which is capable of operating within a limited defined underground geographical area.

A further advantage of the present system is that it does not require any special communications cable for installation.

A further advantage of the present invention is that it provides for a communications system which may be easily and quickly installed.

A further advantage of the present invention is that it provides a communications system which is operational on medium frequency (MF) principles.

A further advantage of the present invention is that it provides for direct communications between mobile miners and vehicles within the mine as well as to ground stations.

A further advantage of the present invention is that it provides a radio communications system wherein the transceiver may be carried by mobile individuals in such a manner that it does not interfere with their mining tasks.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a diagrammatic illustration of an underground mine MF radio communications system of the present invention;

FIG. 2 is a diagrammatic block illustration of the system of FIG. 1 operating in the coal-seam mode;

FIG. 3 is a diagrammatic block illustration of a carrier line signal repeater medium frequency radio communications system of the present invention;

FIG. 4 is a diagrammatic, geometric illustration of a mine site illustrating the "coal seam mode" and propagation of signals from a cellular repeater of FIG. 1;

FIG. 5A is an electrical schematic diagram of a RF coupler of the present invention for coupling a fixed transceiver to a conductive line;

FIG. 5B illustrates a RF coupler of the present invention as coupled to a conductive line;

FIG. 5C is a schematic diagram of a RF coupler of the present invention for transmitting a common signal over a plurality of lines within a mine;

FIG. 5D is an electrical schematic diagram of the RF coupler of FIG. 5C adapted for coupling to two lines;

FIG. 6A illustrates a vest transceiver of the present invention as worn by an individual miner;

FIG. 6B is a layout illustrating the various transceiver electrical components for the vest transceiver of FIG. 6A;

FIG. 6C is a front view of the vest portion to the vest transceiver of FIG. 6A;

FIG. 6D is a back view of the vest portion of the vest transceiver of FIG. 6A; and FIG. 7 is an electrical schematic diagram of the antenna.

DETAILED DESCRIPTION OF THE PREFERRED EMBODIMENT

FIG. 1 illustrates a radio communications network for radio communication by the coal-seam mode with equipment and mine maintenance personnel within an underground mine working section. The network is referred to by the general reference character 10. The network illustrates a system for radio communications from an office or maintenance shop area 12 which is above the ground surface to mobile individuals within a mine 14. Extending from the area 12 is a pair of control wires 15. These may be in the form of a pager telephone pair of wires for carrying audio signals. The mobile individual miners may be roving about within the mine and carrying an individual transceiver 16 for receiving and transmitting radio communications signals. There may also be vehicle transceivers 18 having a loop antenna and roving about within the mine area 14 which also carry transceivers for receiving and transmitting signals between other personnel within the mine area 14 and from the area 12. For example, maintenance crews necessary for maintaining a piece of mining equipment 20 need to communicate with one another and the area 12. Within the mine 14, there are a plurality of individual blocks of coal 22 within the coal seam and intermediate individuals and vehicles. Thus, for communicating by the seam mode it is necessary to propagate coal-seam mode signals through the coal seams to the mobile individuals 16 and/or vehicles 18, each of which has a transceiver. The mobile transceivers 16 and 18 are tuned to receive signals of frequency $F_1$ and transmit at either $F_1$ or $F_2$.

Attached to the line 15 and within the mine area 14 is a cellular repeater 23 tied to a pair of a loop antennas 24 and 25. The repeater 23 serves as a transceiver capable of transmitting at a frequency $F_1$ and receiving at a frequency $F_2$. In operation, communications may be conducted from the area 12 over the line 15 to cause the cellular repeater 23 to transmit at $F_1$. Thus, there is propagation from the antenna 25 within the area 14. Area 12 may also receive demodulated voice signals at the frequency $F_2$ from the work area 14 via the cellular repeater 23 and line 15. This occurs when either transceiver 16 or 18 transmits at $F_2$. The cellular repeater picks up such propagated $F_2$ signals and retransmits them at $F_1$ on the line 15. FIG. 2 diagrammatically illustrates the interaction within the cell mode of the communications system of FIG. 1. FIG. 2 illustrates the use of radio equipment in the transmission line mode wherein existing mine wiring provides the physical means to communicate or carry line signals. Also, in the near vicinity of the wiring, parasitic coupling to the mine wiring via the coal-seam mode also exists.

FIG. 1 further illustrates a power plant in the form of a conductive power cable 26 joined to an underground power center 28. The cable 26 extends throughout the mine from above ground surface. The power center 28 provides power to equipment and utilities including the cellular repeater 23. The cable 26 further serves as a means for assisting in communication within and about the mine.

In functioning as part of a radio communications system, MF signals may be communicated along the power plant 28 from a base station 27. The base station 27 is a transceiver capable of transmitting at $F_1$ and $F_2$ and receiving at $F_1$. This mode of communication is referred to herein as the transmission line mode and referred to by the general reference character 29 (see FIG. 3). Audio signals to the base station 27 may originate with a microphone 30 within the area 12. Signals from the base station 27 to the area 12 may terminate at a speaker 31 within the area 12. FIG. 3 diagrammatrically illustrates the interaction within the transmission mode system 29. The base station 27 is parasitically coupled to the power line 26 by means of a radio frequency line coupler 32. The power line 26 extends underground in the mine passageways and to within the general working area of the mine 14. The power line 26, being a general power line for carrying electrical power to equipment, carries power within a completely different frequency range such that there is no interference from the MF intelligence signals. It is to be noted that the line 26 is not dedicated for the communications system. In essence, the present system merely uses the line 26 to "piggy-back" radio frequency signals. It serves as a conductor for the MF signals without interfering with the other functions of the line 26.

Attached to the power line 26 is a carrier line signal repeater 33 using a plurality of RF line couplers 32. The repeater 32 receives and transmits signals along the line 26. The repeater(s) 33 are generally located in passageways along the power line. The repeater receives the RF signal from the line 26 at a first frequency, e.g., $F_2$ and retransmits it to the line 26 at a second frequency, e.g., $F_1$ at increased power. Thus, the signal is repeated at higher power for further transmission distances. Within a mine there may be a plurality of carrier line signal repeaters with each repeater located remote from another along the line. Thus by locating and controlling the number of carrier line signal repeaters, the desired degree of coverage by the transmission mode system 29 can be achieved.

In operation the MF signals generated at the base station 27 may be coupled to the line 15 to be picked up by the cellular repeater 23. Additionally or alternatively, the MF signals may be coupled to the line 26. The line 26 carries the MF signals to the area of the carrier signal repeater 32 where the signal is amplified. The cellular repeater is coupled to the line 15 to receive the MF signals from the line 15 as well as the transceivers 16 and 18. The transceivers 16 and 18 communicate with one another, the repeater 23 and the line 26 by coal-seam mode propagation. The repeater 23 transmission creates a coal-seam mode signal at a frequency $F_1$ that propagates through the coal seam to the roving mechanic 16, wearing a transceiver tuned to receive on $F_1$, who may be performing maintenance on the equipment 20 or conducting other maintenance activities. The MF signals may also be communicated at frequency $F_1$ to the roving vehicle transceiver 18, whose operator may also be working on the equipment 20 or be outside of the immediate area of the equipment 20. Such communications systems provide the individual workman carrying transceivers 16 and those in vehicular transceivers 18 the opportunity to communicate with one another and with the maintenance surface office at the base station 12. Thus, the maintenance surface office 12 may provide instructions to the maintenance workers and/or other assistance as well as arrange for the delivery of repair parts to the workmen at the particular location designated.

As illustrated in FIG. 1, the cellular repeater 23 includes a loop antenna 25 to generate signals that are capable of propagating through coal medium. In the conducting coal seam, bounded above and below by more conductive rocks, medium frequency signals propagate in an approximate transmission line mode. The attenuation rate of the signal is dependent upon the signal carrier frequency, rock and coal conductivity and the permittivity of the coal. Some reported measurements indicate that the maximum communication range through a coal seam for the coal-seam mode signals occurs for signal carrier frequencies between 500 kHz and 800 kHz. The repeater 23 relays by re-transmission the MF intelligence message received on the line 15 from the base station 12 to the transceiver 16 and/or 18 at the medium frequency $F_1$. The repeater 23 is tuned to transmit at the frequency $F_1$. The repeater is also tuned to receive propagated signals of the frequency $F_2$. Thus, the transceivers 16 and 18, within the communication range of the cellular repeater 23, may always be tuned to receive (illustrated by "R") signals of the frequency $F_1$ and tuned to transmit (illustrated by "T") signals at a transmission frequency $F_2$ to reach the repeater 23 and communicate with the surface area 12 and each other. The frequencies $F_1$ and $F_2$ are both within the MF range and separated by at least sixty kHz so a not to interfere with one another. The transceivers 16 and 18 may create a local mobile-to-mobile network, isolated from the area 12, by transmitting on the frequency $F_1$. To simultaneously communicate with the fixed base area 12, the transceivers 16 and/or 18 transmit at $F_2$ and the repeater 23 then transmits that signal at $F_1$. The cellular repeater 23 is adapted to illuminate a "cell" or limited area of the mine, such as a working section only. However, to controllable expand the coverage, additional cellular repeaters may be connected to the line 15 at select locations.

FIG. 3 diagrammatically illustrates the transmission mode with the carrier line signal repeater network wherein the mobile transceivers may readily talk back and forth with the base station 27. The signal frequencies used in the mine area 14 to communicate between the mobile miners 16 and 18 and the base station 27 are illustrated as $F_1$ and $F_2$. The coupler 32 near the base station 27 couples signals from the base station 27 on to the line 26. The signals on the line 26 may be "boosted" by coupling them off by another coupler 32 at frequency $F_2$ to the carrier line repeater 33. The repeater then retransmits the "boosted" signal at the frequency $F_1$ and couples it back to the line 26. Transceivers 16 and/or 18 may receive the $F_1$ signals propagated from the line 26.

The repeater 33 operates in the simplex/half duplex mode so that a calling mobile transceiver 16 or 18 using the transmitting frequency $F_2$ can also reach a distant mobile transceiver in the mine section but out of the direct range $F_1$ parasitic transmission. The simplex/half duplex mode implies that the repeater 33 receives messages on the carrier frequency $F_2$ and simultaneously retransmits the same message on a different carrier frequency $F_1$. The transceivers 16 and 18 are tuned to receive at $F_1$ and thus receive the communication as it is propagated parasitically at $F_1$.

FIG. 4 is a simplified geometric illustration of an in-mine site, illustrating the coal-seam mode propagation. As illustrated there is generally a coal seam 35 which has a coal seam conductivity. There are also roof and floor rock layers 36 and 37 which have a conductivity constant ($\sigma_c$). It has been found that the coal seam conductivity is generally several orders of magnitude less than that of the conductivity of the rock ($\sigma_r$). Accordingly, when excited, the antenna 25 that is at least partially vertically oriented produces a vertical electrical field ($E_z$) 38 and horizontal magnetic field (H) 39. It has been found that in the highly conductive rock formation, the fields diminish exponentially in the Z-direction. In the coal seam 35, the fields diminish exponentially at a rate determined by the attenuation constant ($\alpha$) which in turn depends on the electrical properties of the coal. An inverse square-root factor also exists because of spreading. The effect is that the wave propagates between the highly conducting rock layers 36 and 37 and within the lower conductive coal seam 35. It has been found that the fact that the coal seam may have entries and cross cuts is of minor effect. In the presence of conductors, the situation changes considerably. The effects of the conductors may totally dominate over the effects of the geology. In general, the presence of the conductors (rails, trolley cars, phone lines and/or power lines) is of an advantage.

Medium frequency (MF) carriers, i.e., 300 kHz–3 MHz, have the property of being able to couple into and re-radiate from continuous conductors in such a way that these conductors become the transmission lines and the antenna system for the medium frequency carrier signals. The most favorable carrier frequency depends to some extent on the relationship between the geology and existing conductors. Higher frequencies within the MF range are preferable in areas of no conductors because attenuation is less for higher frequencies. Also, once the signal is coupled into a conductor, lower frequencies suffer less attenuation. However, the very act of inductive coupling from a portable radio to a conductor favors higher carrier frequencies. Accordingly the frequency effects are broad. It has been found that signals within the carrier frequency range of 500 kHz to 800 kHz will usually be preferable.

The range of communications for the system within the mine 14 is dependent on point-to-point radio propagation aided by parasitic coupling. As illustrated in FIG. 3, transmission on carrier frequency $F_2$ causes carrier line signal repeater action to occur with the repeater 32 when the transceivers transmit back on carrier $F_2$. Since the repeater receives from the line 26 on carrier frequency $F_2$, it isolates the line 26 and thus area 12 from signals transmitted by the transceivers 16 and 18 on frequency $F_1$. However, by receiving signals at frequency $F_2$ and retransmitting them at carrier frequency $F_1$, it permits the mobile transceiver units, for example units 16 and 18, to be separated by very large distances and even with coal seams and/or rock seams intermediate. With this system, it is only necessary for the mobile transmitter 16 or 18 to transmit a signal at $F_2$ sufficient to reach the line 26 near the carrier line signal repeater unit 32, either directly or by parasitic coupling. Also, communications from the mobile transceivers to the base area through the carrier line signal repeater 32 may be maintained by the transceivers 16 and 18 selectively communicating on carrier frequency $F_2$. Also, it is noteworthy that the system acts as a party line with all transceivers being able to hear all radio communications within its particular cell area.

The system permits simultaneous communications by various networks over the common line 26. This may be accomplished by each network using different carrier frequencies. Thus, it is possible that within a mine facility two or more communications networks may be operated independent of the other within the mine and a plurality of different networks may be set up within the mine complex for different functions. For example, a communication network operating within certain frequencies may be set up for the maintenance crew, a second communication network operating with different frequencies for the haulage crew, a third communication network set up for the production crew, etc. Each of these networks can then be operated independent of the other and simultaneously by merely using different frequency ranges. In practice, individual communication networks can be easily installed by coupling a transceiver of a base station at the portal of the mine to an electrical conductor in a wire plant by means of an RF coupler 32. Each base station transceiver and associated coupler is tuned to separate MF frequencies. The individual in-mine mobile transceivers affiliated with that network are then tuned to operate on the assigned carrier frequency so as to communicate with each other in that network and with the base station.

For effective system operation, it is necessary that the fixed transceivers have efficient antennas. In the transmission line mode operation, this is needed so that the associated local wire plant, e.g., power line 26, can be properly illuminated with the MF signals and the MF signals on the wire plant can be properly received by the repeaters. For common seam mode operation, the cellular repeaters within the mine, for example cellular repeater 23, may use a loop antenna attached to the rib or post in such a way that it is vertical and positioned where there is little danger of the antenna being damaged in normal mine activities. As illustrated in FIG. 4, this antenna produces a large magnetic moment which provides the signal for local-cell coverage. The signal is aided by parasitic coupling and re-radiation effects. The signals are then picked up by the mobile transceivers 16 or/and 18 within the area. Also, signals of $F_2$ from the transceivers may then be picked up by parasitic coupling.

The RF coupler 32 is designed to permit efficient coupling of the base station 27 and carrier line signal repeaters 33 to the local wire plant 26. FIG. 5A and 5B illustrate such an RF line coupler 32 as coupled to the power line 26 with FIG. 5A illustrating an electrical circuit diagram of the coupler and FIG. 5B the physical coupler as coupled to the power line 26. As illustrated, the coupler 32 may be easily clamped around the electrical conductors 26. The received MF signal current flowing through the conductor 26 produces a coupler output signal $V_0$ which is applied to the input at the base station 27 or at the repeater 33. The coupler 32 includes a pair of capacitors 40 and 42 tied in series with one another and across a coil 44. The combination of the capacitors 40, 42 and inductor 44 form a tuned circuit having a tuned MF frequency, e.g., $F_1$. Thus, the RF line coupler 32 acts as a current transformer for driving the local wire plant, e.g., power line 26. As illustrated in FIG. 5B, the coupler 32 provides for a low cost installation because the coupler 32 can be simply clamped around the wire 26 for inductive coupling.

FIGS. 5C and 5D illustrate a situation in a mine wherein both a telephone cable 45 and power cable 26 exist in the same mine entry for a short distance and then split off into separate underground paths to different areas. To accommodate a network in which it is desired to have communications with areas along both paths, a RF line coupler 46 as illustrated in FIGS. 5C and 5D may be utilized. The coupler 46 is in part similar to the coupler 32 and further including a slave coil 47 attached thereto by means of a pair of lines 48 and 50 tied across the coil 44. The coil 47 is separated from the coil 44 by a separation distance SD commensurate with the separation distance SD between the telephone power line 45 and power cable 26. In the coupler 46, the capacitors 40 and 42 in combination with the coils 44 and 47 form a tuned circuit to tune both the cables 26 and 45 to the same carrier frequency. Thus, the coils 44 and 47 can be coupled to accept a multiplicity of cables.

In the illustrated system, the transceivers 16 and 18 are mobile and the transceiver 16 is intended to be worn by an individual in such a manner as not to impede the individual's work tasks. FIG. 6A illustrates an individual wearing a vest transceiver referred to by a general reference character 52. The vest transceiver 52 includes electronic modules and speaker assembly, as separately illustrated in FIG. 6B and referred to by the general reference character 53. The transceiver 52 further includes a vest as separately illustrated in FIGS. 6C and 6D and referred to by the general reference character 56. FIG. 6C illustrates the front side and FIG. 6D illustrates the backside of the vest 56 with a loop antenna 58 embedded therein. As illustrated in FIGS. 6A and 6B the transceiver 16 includes a wiring harness 60 and a wiring harness 61 which are embedded in channels 62 and 63 within shoulder straps 64 and 65, respectively, of the vest 56. Also, a pair of wiring harnesses 66 and 67 are embedded in channels 68 and 69 respectively within the front portion of the vest 56.

The harness 66 interconnects a transceiver module 70 supported within a pocket 71 to a transceiver module 72 positioned within a vest pocket 73 and to a harness 74 positioned within a channel 75 leading to a microphone assembly 76.

A transceiver 77 is positioned within a pocket 78 and connected to the harness 67. The harness 67 is connected to a module 70 positioned within a pocket 80. The harness 67 is also connected to a harness 82 positioned within a channel 84 and connected to the microphone 76. The module 79 is also connected to the harness 61. On the top of the vest at the shoulder blade areas are a pair of speakers 88 and 90. The speakers 88 and 90 are of the epaulet type and oriented to direct sound waves along the neck of the individual towards the miner's ears. The miner's hardhat 92 acts as a reverberant chamber for the sound waves so that they are readily audible to the individual. The transceiver 56 further includes a harness 93 to tie to a battery source $+V$ which is carried by the individual.

The microphone 76 is stationary relative to the individual's body. Also, with the transceiver structure 53, there are no leads extending from the miner's body which would otherwise become entangled with other equipment within the mine. Furthermore the transceiver modules 70, 72 77 and 79 are all mounted within vest pockets 71, 73, 78 and 80 respectively, such that their weight is evenly distributed. As such the modules place minimal weight and/or stress on the individual.

In the back portion of the vest 56, the loop antenna structure 58 is sewn in a channel 94. The channel 94 serves to support and maintain the antenna structure in a fixed plane so as to maintain the loop area constant. This constant area may be indicated by A. As such, the inductance of the antenna does not change with the movement of the roving miner due to any change in area. Furthermore since the number of turns is constant, then inductance remains substantially stable notwithstanding movement of the individual. Mathematically, this is illustrated by the equation $L=(f)AN^2$ wherein L is inductance, N the number of turns and A the area. For illustrative purposes the electrical circuit for the antenna 58 is illustrated in FIG. 7. It includes a pair of inductors 95A and 95B tied electrically in parallel. Across the coil 95A is a pair of capacitors 96A and 96B. The input leads are tied across the capacitor 96B.

The current $i_S$ circulating in the loop 58 is a function of the voltage and an inverse function of the frequency and inductance. For example it may be represented as:

$$i_S = v/(j\omega L)$$

where L is the inductance in the loop in Henrys, v is voltage in volts and $i_S$ is cirrent in amperes. Thus, if the inductance is divided in half, the applied voltage may also be divided in half for the same loop circulating current. This facilitates the physical construction of the loop antenna since the dielectric standing voltage of the timing capacitors are reduced by one half. Also, the magnetic moment $M = NIA$ where N is the number of turns in the loop, A is the area, and I is the circulating current. Thus, the magnetic moment, for the loop antenna 58 is a direct function of the circulating current and since the area and turns are constant, variations of the magnetic moment are essentially solely dependent on the circulating current. The antenna loop 58 functions as both a receiver and transmitter antenna.

Although the present invention is described in terms of the present preferred embodiments, it is to be understood that such disclosure is not to be interpreted as limiting. Various alterations and modifications will undoubtedly become apparent to those skilled in the art after having read the above disclosure. Accordingly, it is intended that the appended claims be interpreted as covering all alterations and modifications as fall within the true spirit and scope of the invention.

I claim:

1. A radio communication system for underground communication, comprising in combination:
    a transceiver base station including means to transmit intelligence radio signals modulated responsive to audio signals at a first carrier frequency $F_1$ and at a second carrier frequency $F_2$ and to receive intelligence radio signals at the frequency $F_1$, said frequencies $F_1$ and $F_2$ being within the medium frequency range and separated from each other by approximately sixty kHz;
    a base station radio frequency inductive line coupler connected to the base station transceiver, said coupler including an inductive coil for placing about a conductive line extending within a mine and a capacitive member connected to said inductive coil to form a tuned circuit whereby said intelligence signals originating from the base station transceiver may be inductively transferred to said conductive line and carried thereby to remote points within the mine, and signals from within the mine may be carried to the transceiver;
    a first radio frequency cellular repeater located within the mine and coupled to the base station, the repeater including a vertically oriented first tuned loop antenna for transmitting intelligence signals from the base station by radio propagation and a second vertically oriented tuned loop antenna for receiving radio signals from within the mine, said tuned loop antennas being adapted to excite a coal seam propagation mode; and
    at least one mobile transceiver located within the mine and adapted for tuning to said frequency $F_1$, the mobile transceiver including a vertically oriented tuned loop antenna adapted for exciting a coal seam propagation mode, the mobile transceiver being adapted to receive radio propagation signals transmitted by the first radio frequency cellular repeater and by the conductive line and to further transmit radio propagation signals to the repeater and to the conductive line.

2. The radio communication system of claim 1 wherein
    the mobile transceiver is self-contained and includes attachment means for mounting on an individual miner whereby said transceiver is stationary relative to the miner's body.

3. The radio communication system of claim 2 wherein
    said attachment means includes a vest garment for wearing by an individual miner, said vest including a plurality of pockets for mounting a plurality of transceiver modules therein, and further including a channel through which said loop antenna may be inserted whereby said antenna is supported and maintained in a vertical position.

4. The radio communication system of claim 3 wherein
    the loop antenna includes two loops connected electrically in parallel and tuned by capacitive means in parallel with said two loops.

5. The radio communication system of claim 1 wherein
    the cellular repeater is adapted to receive from said base station signals of said first frequency and to transmit by radio propagation said signal at said first frequency, the repeater being further adapted to receive radio propagation signals of said second medium frequency to transmit to said base station.

6. The radio communication system of claim 1 wherein
    at least one of the mobile transceivers have means to transmit at both frequencies $F_1$ and $F_2$.

7. The radio communication system of claim 6 wherein
    said mobile transceivers have tuning means to receive only one of said frequencies.

8. The radio communication system of claim 1 and further including:
    a first radio frequency carrier line repeater coupled through a radio frequency inductive line coupler, to the conductive line extending within the mine, said repeater being adapted to receive intelligence signals from the conductive line at said first frequency $F_1$ and to amplify and retransmit said intelligence signals on said second carrier frequency $F_2$ through said conductive line, said repeater being positioned remotely from said first radio frequency line coupler and from said first radio frequency cellular repeater.

9. The radio communication system of claim 8 wherein
    said first carrier line signal repeater includes a first and a second radio frequency inductive line coupler for placing around a conductive line, said carrier line signal repeater being adapted to receive an intelligence signal from said conductive line on said first carrier frequency $F_1$ through said first coupler and to transmit said intelligence signal at increased power through said second coupler.

10. The radio communication system of claim 9 including
    a plurality of mobile transceivers, each of said transceivers being adapted to receive signals at the carrier frequency $F_1$, at least one of said transceivers being adapted to transmit at said frequency $F_1$ and at least one of said transceivers being adapted to transmit at said frequency $F_2$.

11. The radio communication system of claim 10 wherein
    the carrier line signal repeater is adapted to receive signals having a frequency equal to the transmitter frequency of at least one of said transceivers.

12. The radio communication system of claim 9 wherein
    the carrier line signal repeater is coupled to the conductive line by the first radio frequency inductive line coupler which has an inductive coil and a capacitive member connected to form a first tuned circuit, said inductive coil being adapted for inductive coupling about the conductive line, and the repeater is further coupled to the conductive line by the second radio frequency inductive line coupler which has an inductive coil and a capacitive member connected to form a second tuned circuit of a different frequency than said first tuned circuit.

13. The radio communication system of claim 9 wherein
   at least one radio frequency line coupler includes at least two inductive elements connected electrically to each other, each of said elements being adapted for inductive coupling to a conductive line extending within the mine whereby a common base station transceiver may be coupled to a plurality of conductive lines.

14. The radio communication of claim 9 and further including
   a plurality of radio frequency inductive line couplers and a plurality of carrier line signal repeaters, each carrier line signal repeater having at least one inductive line coupler connected to it, said repeaters and associated couplers being positioned about said conductive line at points remote from said base station and from said first repeater.

* * * * *